United States Patent [19]
Kikuchi

[11] Patent Number: 5,172,268
[45] Date of Patent: Dec. 15, 1992

[54] IMAGE STABILIZING OPTICAL SYSTEM
[75] Inventor: Juro Kikuchi, Kitatsuru, Japan
[73] Assignee: Olympus Optical Co., Ltd., Tokyo, Japan
[21] Appl. No.: 585,675
[22] Filed: Sep. 20, 1990
[30] Foreign Application Priority Data Sep. 21, 1989 [JP] Japan .................. 1-246120

[51] Int. Cl.$^5$ .............................. G02B 27/64
[52] U.S. Cl. ................................... 359/557
[58] Field of Search ............... 350/500; 359/554, 557

[56] References Cited

U.S. PATENT DOCUMENTS 3,953,106 4/1976 Furukawa et al. ............ 350/500
4,978,205 12/1990 Sato ............................... 359/557

FOREIGN PATENT DOCUMENTS 1-140119 6/1989 Japan .
1-140120 6/1989 Japan .

OTHER PUBLICATIONS

Y. Netzer, "Line-of-sight steering and stabilization", SPIE Optical Engineering, vol. 21(1), Jan./Feb. 1982, pp. 359-367.

*Primary Examiner*—Scott J. Sugarman
*Attorney, Agent, or Firm*—Cushman, Darby & Cushman

[57] ABSTRACT

The image stabilizing optical system comprises a master lens, and a meniscus lens arranged between the master lens and the image surface thereof, and having a concave surface opposed to the exit pupil of the master lens, said meniscus lens having inclination variable relative to the optical axis of the master lens. This image stabilizing optical system is capable of quickly and favorably correcting blur of image produced due to vibration of a photographic lens system without degrading image quality by varying inclination of the meniscus lens in conjunction with the vibration.

2 Claims, 12 Drawing Sheets

$\delta = -d \sin\theta \cdot (\sqrt{n^2 - \sin^2\theta} - \cos\theta)/n$

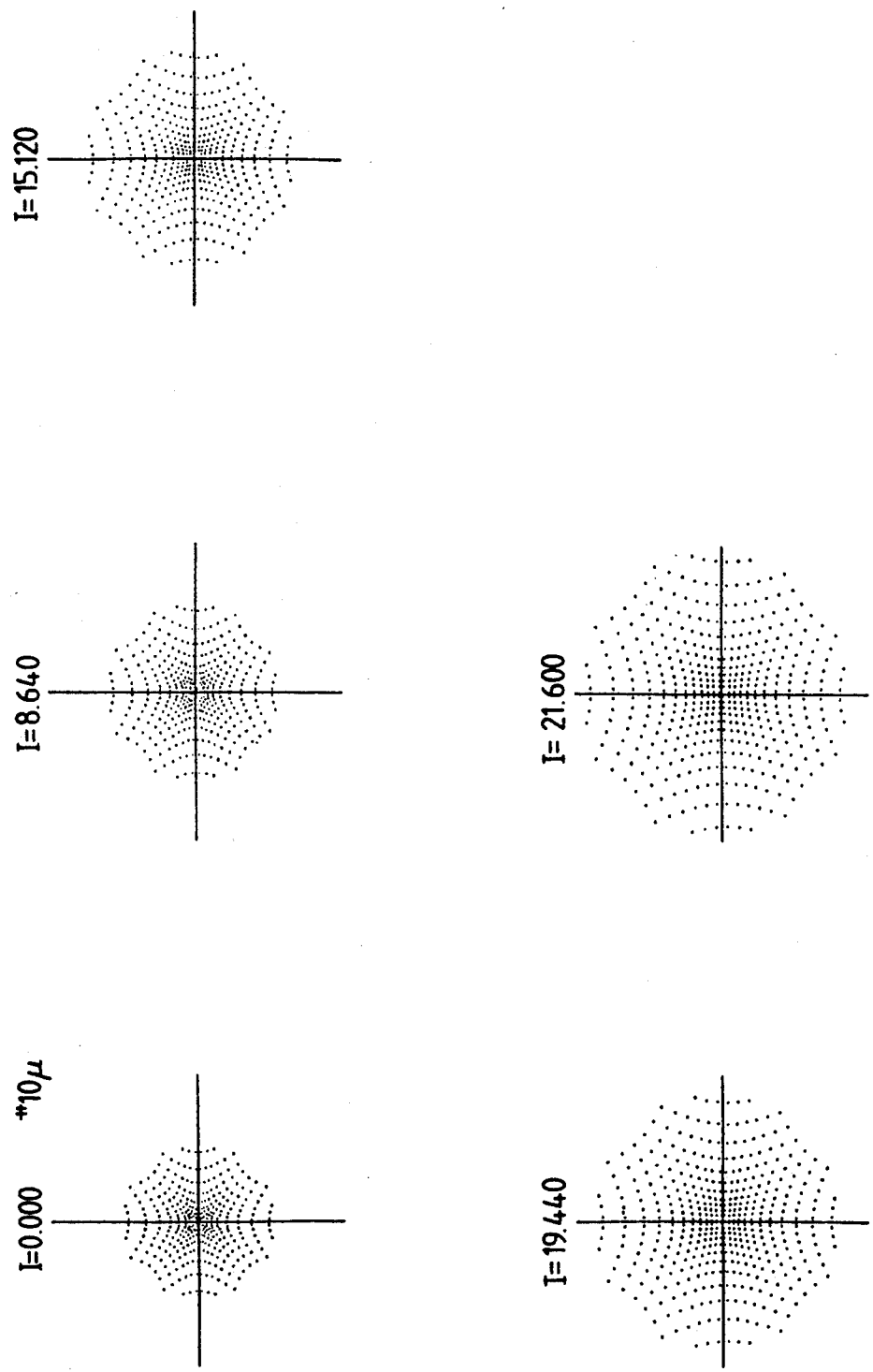

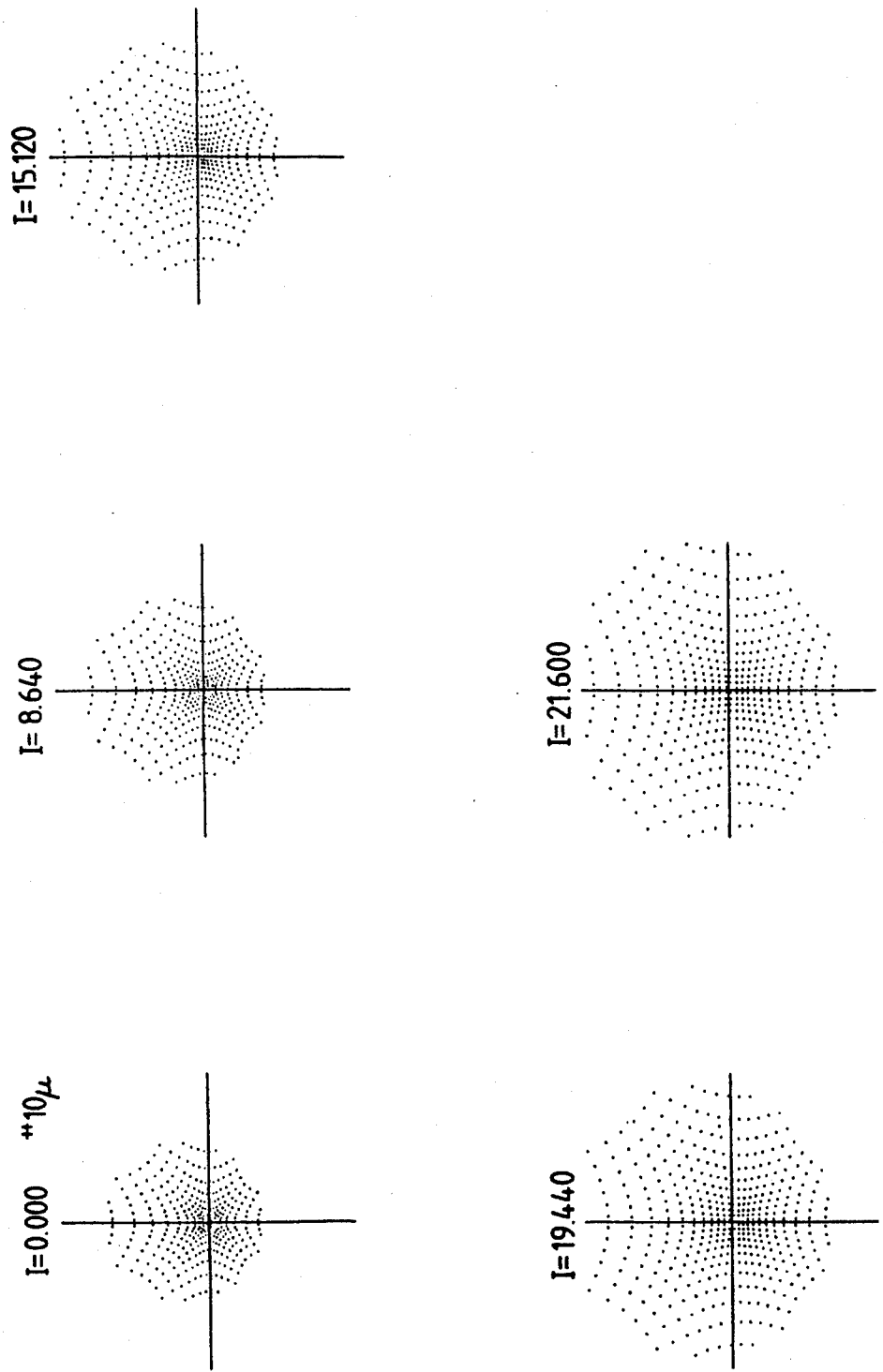

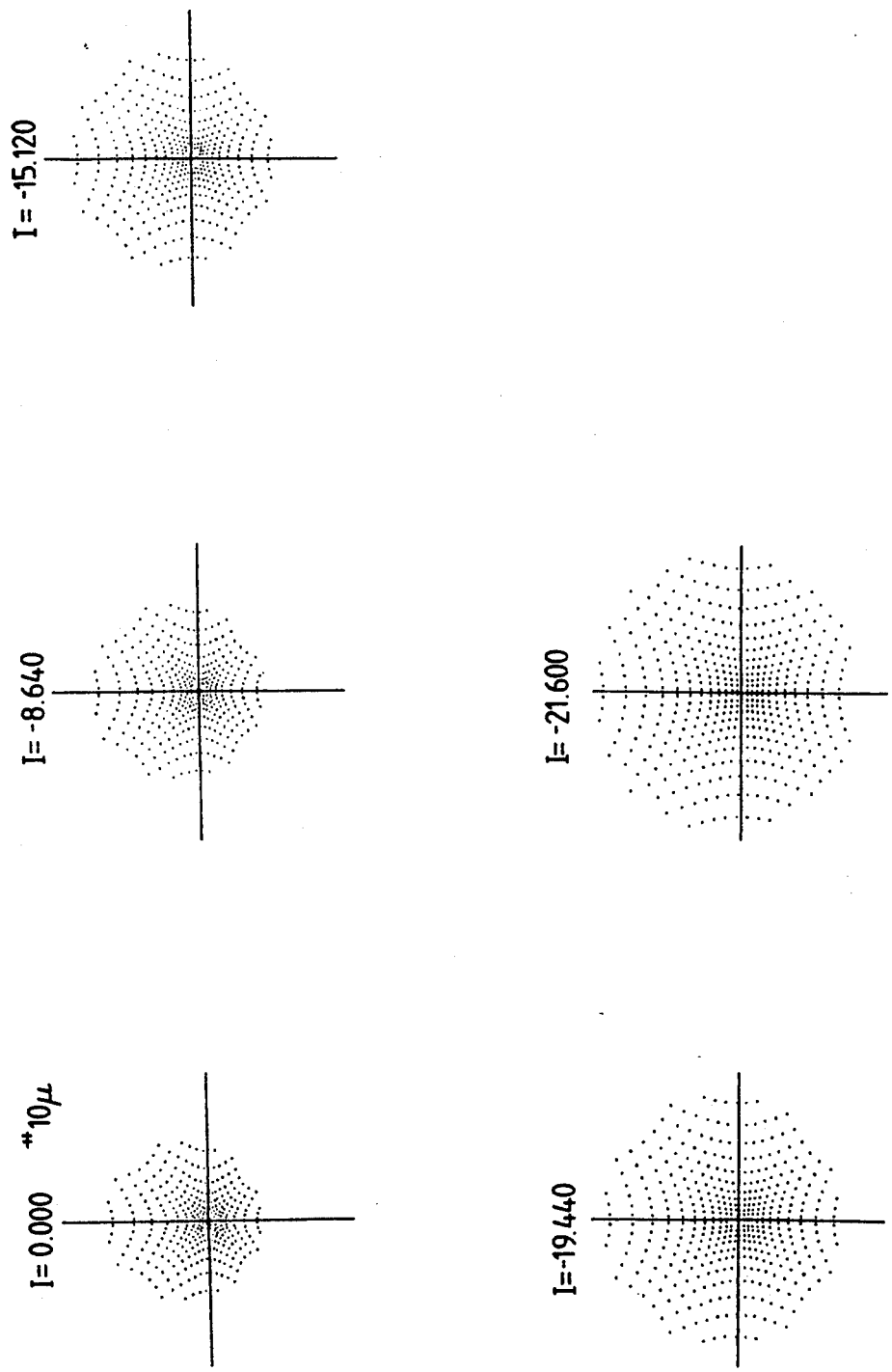

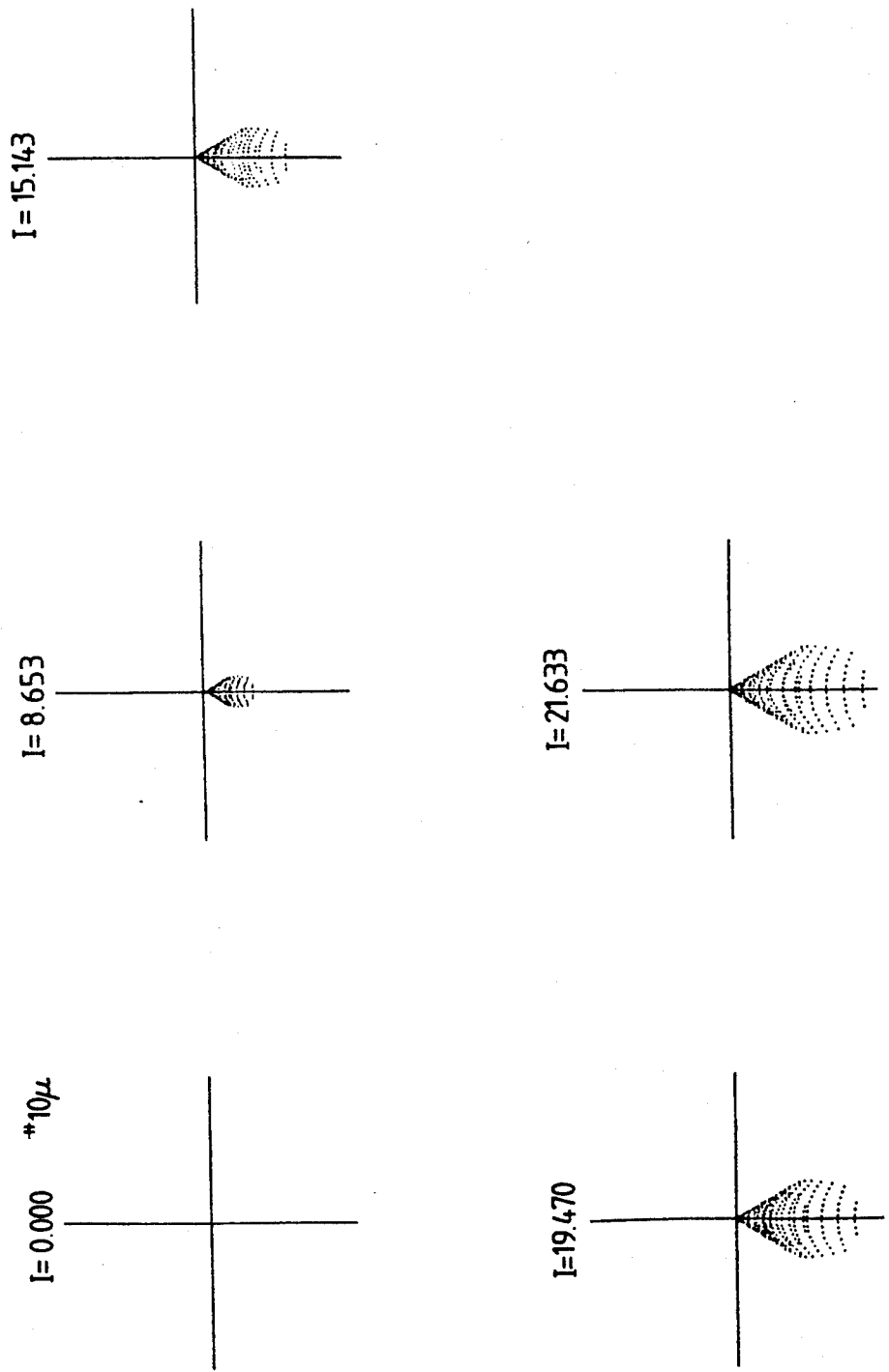

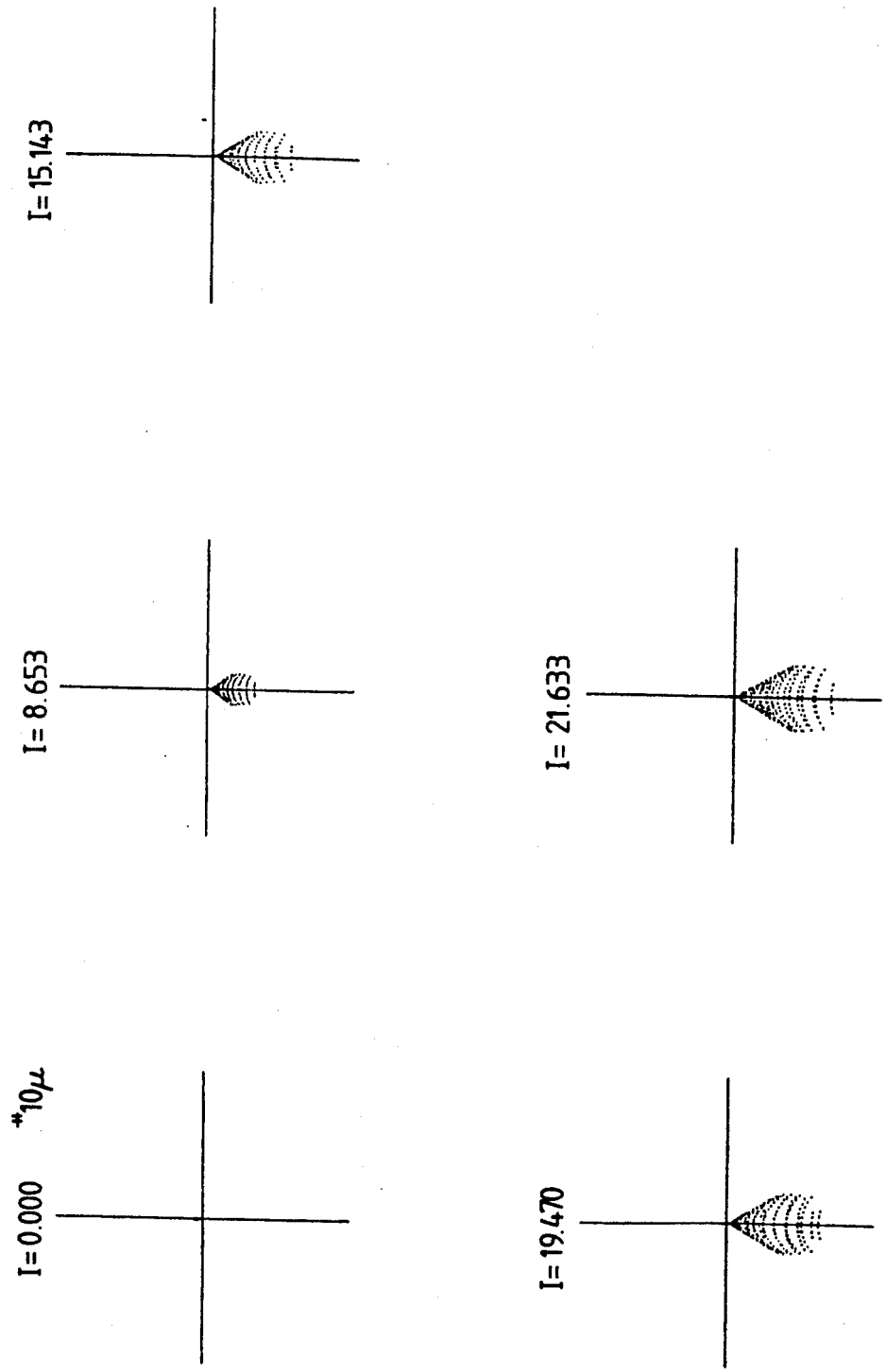

FIG. 14C
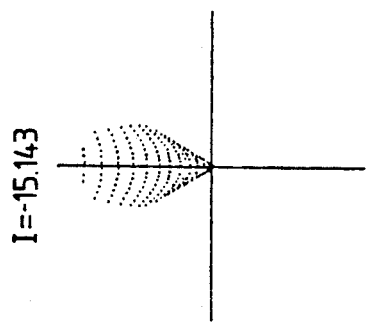
I=0.000
*10μ
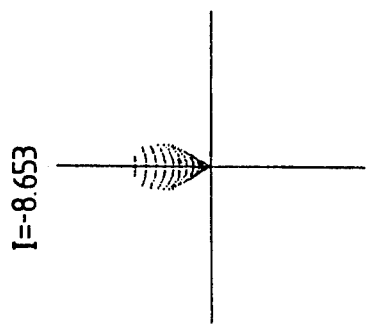
I=-8.653
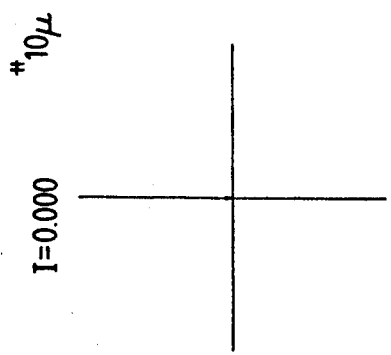
I=-15.143
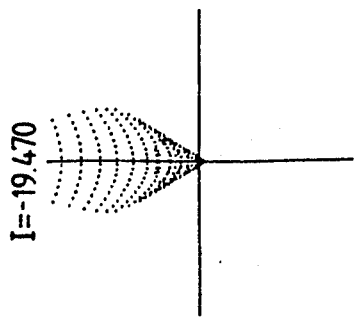
I=-19.470
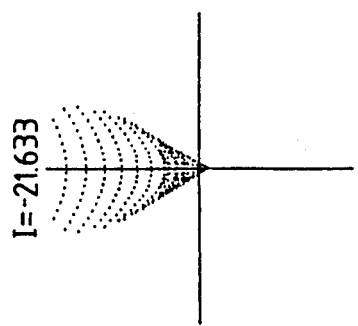
I=-21.633

IMAGE STABILIZING OPTICAL SYSTEM

BACKGROUND OF THE INVENTION a) Field of the invention

The present invention relates to an image stabilizing optical system, and more specifically to an image stabilizing optical system which is suited for correcting blur of images produced by vibrations, etc. of photographic cameras, video cameras and so on.

b) Description of the prior art

Images of objects which are photographed from travelling vehicles and flying aircrafts are blurred due to vibrations transmitted to photographic systems. As means for preventing such hindrance, there have hitherto been proposed various image stabilizing optical systems utilizing plane parallel plates and wedge-shaped prisms.

FIG. 1 illustrates an example of the conventional image stabilizing optical systems which comprises a plane parallel plate 2 arranged on the side of an image surface 3 of a master lens 1 and functions to correct blur of an image formed on the image surface 3 by inclining the plane parallel plate 2 in conjunction with degree of vibration of the image.

FIG. 2 shows another example of the conventional image stabilizing optical systems which comprises a prism 4 having a variable vertical angle which is composed of two types of transparent elastic members 4a and 4b arranged on the object side of the master lens 1, and functions to correct blur of an image formed on the image surface 3 by varying the vertical angle of the prism 4 with two actuators 5 in conjunction with degree of vibration of a photographic system as a whole.

FIG. 3A and FIG. 3B show a third conventional example disclosed by Japanese Patent Preliminary Publication No. Hei 1-140119 which comprises a pair of wedge-shaped prisms 6a and 6b arranged on the side of the image surface of the master lens 1, and functions to correct blur of an image formed on the image surface 3 by moving the wedge-shaped prisms 6a and 6b along the optical axis so as to vary the interval therebetween in conjunction with degree of vibration of the image.

However, when the exit pupil of the master lens 1 is located relatively near the image surface 3 in the image stabilizing optical system illustrated in FIG. 1 the plane parallel plate 2 corrects the image position at degrees different between the central portion and the marginal portion of the image surface 3, whereby the image stabilizing optical system has a defect that it produces new blur on the marginal portion after the blur is corrected at the central portion. Further, the image stabilizing optical system shown in FIG. 2 has a defect that it requires a strong force to control the vertical angle of the prism and must use large actuators for this purpose, thereby enlarging the photographic system to be used therewith and making it difficult to obtain quick response of the photographic system. Furthermore, the image stabilizing optical system shown in FIG. 3A and FIG. 3B cannot practically correct blur in the direction perpendicular to the paper surface without using an additional pair of prisms which are similar to the prisms 6 and arranged perpendicularly thereto, and requires two pairs of wedge-shaped prisms arranged on the image surface 3 of the master lens 1. Accordingly, this image stabilizing optical system has defects that it enlarges the photographic system, that it requires two actuators or complicated control therefor, and that the master lens must have a long back focal length, thereby making it difficult to design a master lens having favorably corrected aberrations.

SUMMARY OF THE INVENTION

In view of the problems described above, it is a primary object of the present invention to provide a compact image stabilizing optical system which has a simple composition, and is capable of correcting, quickly and favorably without degrading image quality, blur of an image produced by vibration of a photographic lens system.

The image stabilizing optical system according to the present invention is characterized in that it comprises a master lens for forming an image of object and a lens component which is arranged between the master lens and the image surface thereof, and has a most object side surface and a most image side surface both concave toward the exit pupil of the master lens, and that it functions to compensate variation of an image position by inclining said lens component relative to the optical axis. Even with a slight inclination angle, the lens component displaces an image for a sufficiently long distance on the image surface, thereby reducing variation of angle of incidence of the ray falling on the marginal portion of the image surface as compared with the variation to be caused with a plane parallel plate, and producing no difference in correction degree between the central portion and the marginal portion of the image surface. Further, the small actuator is sufficient for driving the lens component used in the image stabilizing optical system according to the present invention.

This and other objects as well as the features and the advantages of the present invention will become apparent form the following detailed description of the preferred embodiments when taken in conjunction with the accompanying drawings.

BRIEF DESCRIPTION OF THE DRAWINGS

FIG. 11A; FIG. 11B and FIG. 11C are spot diagrams at various image heights on the image surface in an Embodiment 1 of the present invention;

FIG. 14A, FIG. 14B and FIG. 14C are spot diagrams at various image heights in the Embodiment 2.

DESCRIPTION OF THE PREFERRED EMBODIMENTS

Figure 1:
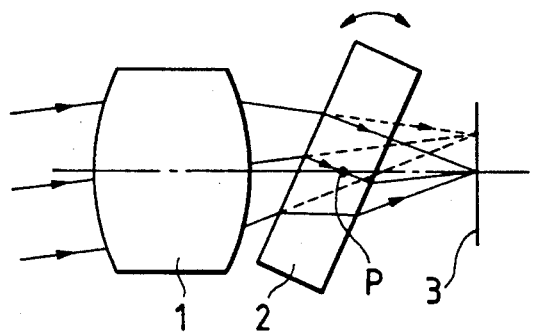
FIG. 1, FIG. 2, FIG. 3A and FIG. 3B are sectional views illustrating the compositions of the three examples of the conventional image stabilizing optical systems which are different from one another.
Figure 2:
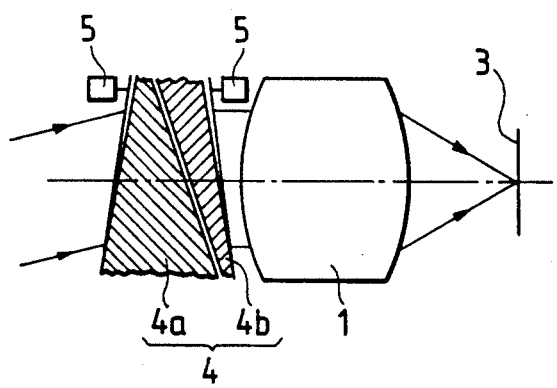
Figure 3A:
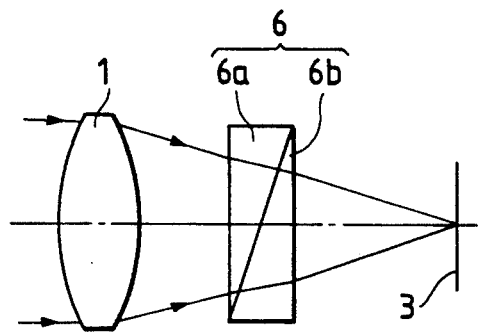
Figure 3B:
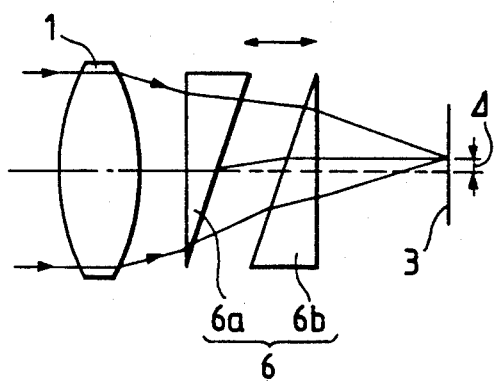

Prior to description of the preferred embodiments of the present invention, the nature of the conventional image stabilizing optical system shown in FIG. 1 (the optical system which comprises a plane parallel plate arranged on the image side of the master lens and functions to compensate the variation of image position on the image surface by rotating the plane parallel plate around a point on the optical axis in conjunction with degree of vibration of the photographic optical system as a whole) will be examined for clarifying the defects thereof or distinguishing the features and advantages of the present invention.

In the image stabilizing optical system in which the plane parallel plate 2 is rotated around a point P on the optical axis as shown in FIG. 1, remarkable aberrations are produced by inclining the plane parallel plate 2 even when the optical system is free from aberrations in the condition where the plane parallel plate is set perpendicular to the optical axis. Since the optical system is not rotationally symmetrical with regard to the optical axis in the condition where the plane parallel plate 2 is inclined, these aberrations cannot be classified among Seidel's five aberrations, but can be divided mainly into a phenomenon of blur of spot images produced by the rays not converging to a point and displacement of image position along the optical axis (partial aberration), and another phenomenon of line images of offaxial points combined with stationary images of paraxial points due to difference in displacement distance between the paraxial points and the offaxial points (time aberration). The spatial aberration will hereinafter be represented by deviations of the marginal rays and the optical axis, and referred to as "blur of spot images", whereas the time aberration will hereinafter be represented by the difference in displacement distance between the optical axis and the offaxial principal ray, and referred to as "expansion/contraction of image".

Figure 4:
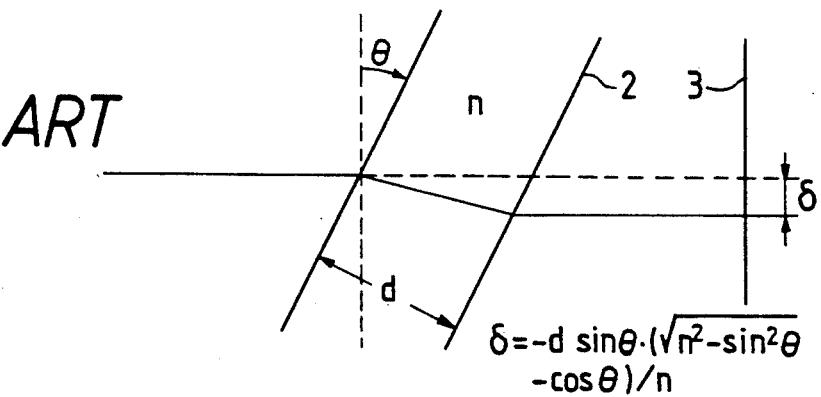
FIG. 4 through FIG. 6 are diagrams descriptive of the definitions of displacement of optical axis, blur of a spot image and expansion/contraction of image caused by inclining the plane parallel plates in the conventional image stabilizing optical systems using the plane parallel plates.
Figure 5:
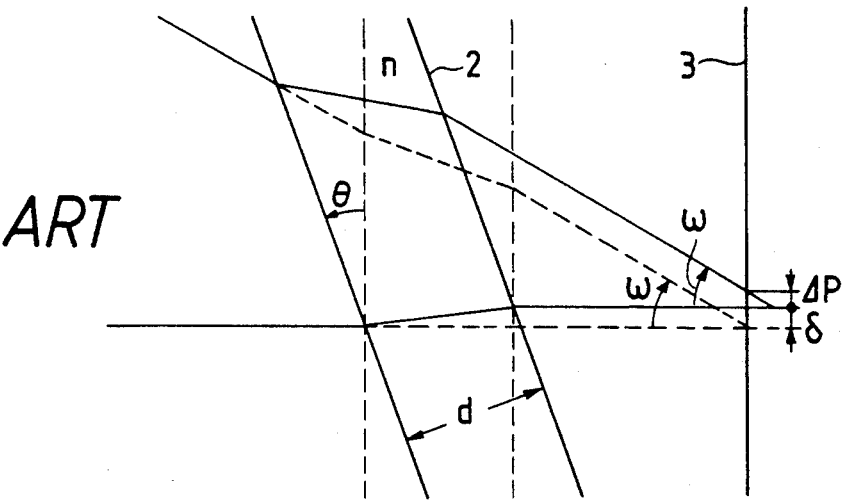
Figure 6:
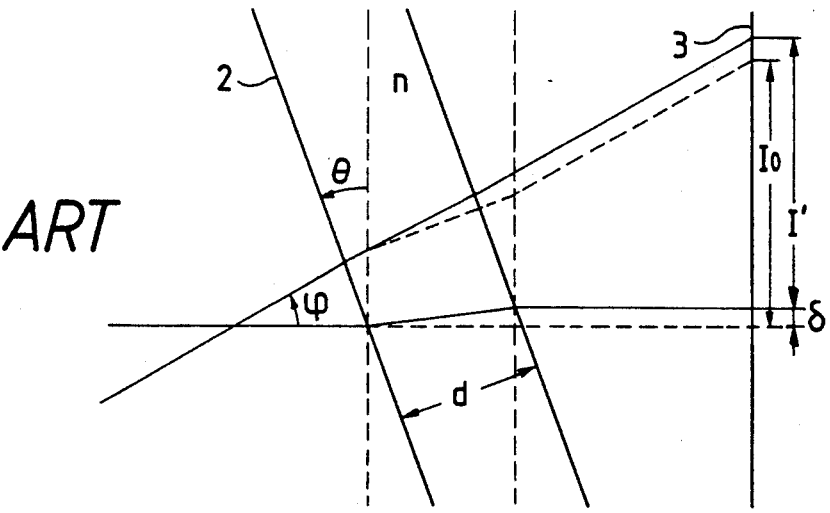
Figure 7:
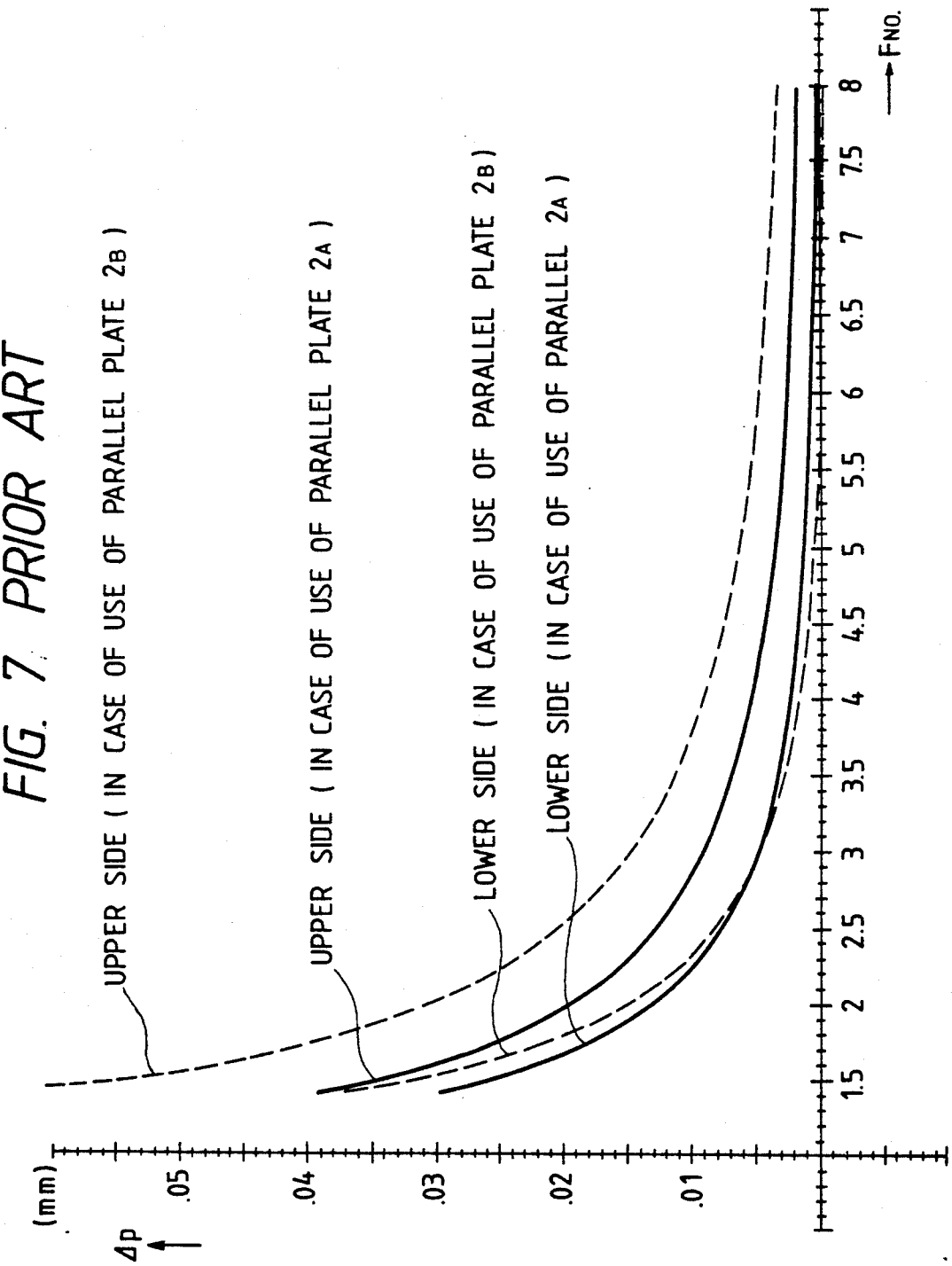
FIG. 7 and FIG. 8 are graphs illustrating relationship between blur of a spot image caused by inclination of the plane parallel plate and F-number, and graphs illustrating relationship between expansion/contraction of an image and the distance as measured from the image surface to the exit pupil respectively.
Figure 8:
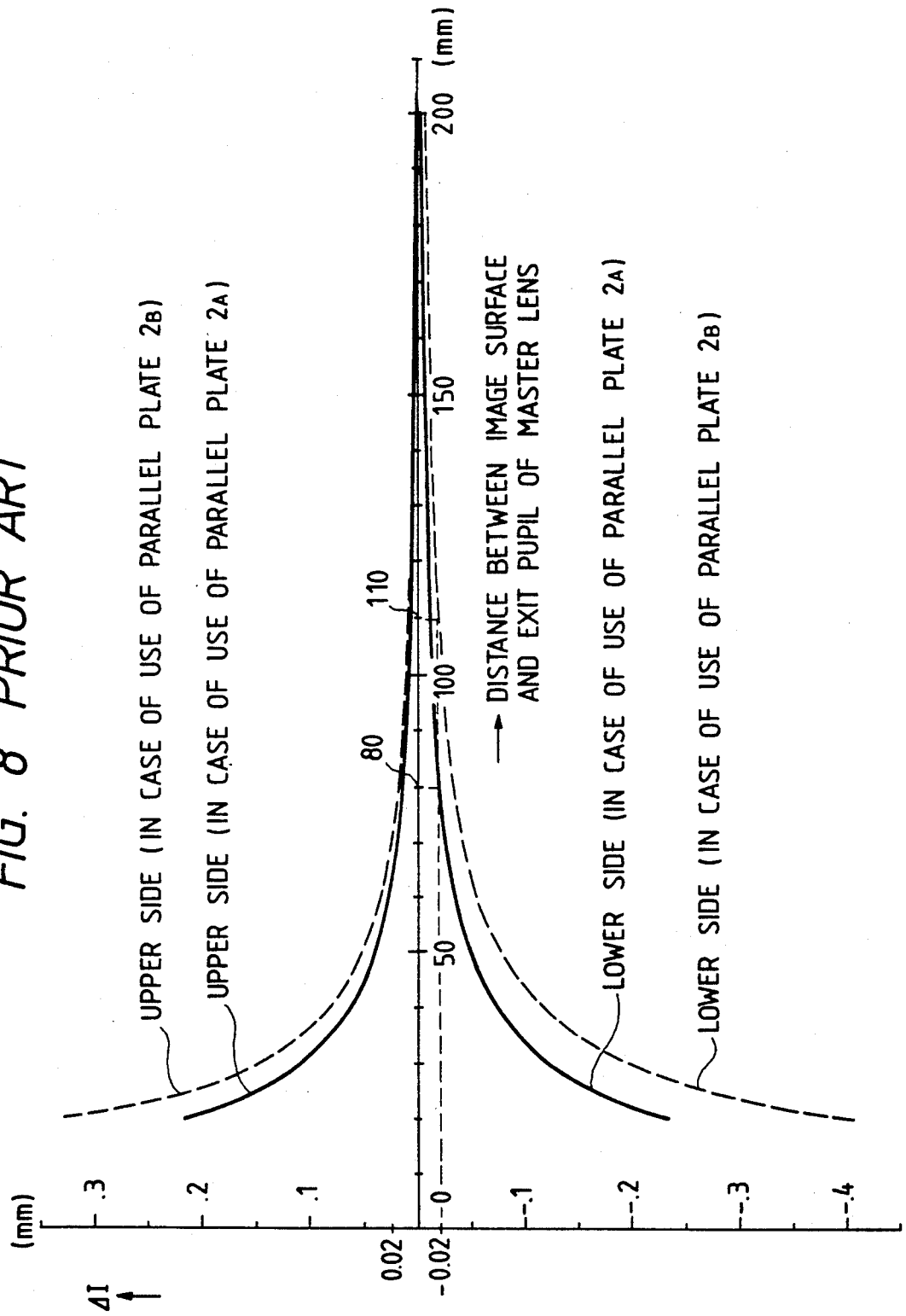

The plane parallel plate 2 and the image surface 3 of the conventional example shown in FIG. 1 are illustrated on an expanded scale in FIG. 4 through FIG. 6 for clarifying the definitions of displacement distance $\delta$ of the optical axis, blur $\Delta P$ of a spot image and expansion/contraction $\Delta I$ of an image respectively caused by inclining the plane parallel plate 2. When the plane parallel plate 2 which has an index of refraction n and thickness d is inclined at an angle $\theta$ from the position perpendicular to the optical axis of the master lens, the optical axis is displaced for $\delta$ on the image surface 3 as shown in FIG. 4. When the plane parallel plate 2 is inclined as shown in FIG. 5, the ray parallel with the optical axis has a larger angle of incidence on the plane parallel plate 2 ($0 \rightarrow \theta$) and the paraxial upper marginal ray also has a larger angle of incidence on the plane parallel plate 2, but the displacement of the optical axis is smaller than that of the marginal ray since the variation of the refracting function is different between the ray parallel with the optical axis and the marginal ray. Accordingly, the intersection between the optical axis and the upper marginal ray is shifted backward from the image surface, thereby producing the blur $\Delta P$. Further, FIG. 6 is a diagram descriptive of the expansion/contraction of image which is produced according to a principle similar to that of the production of the blur $\Delta P$ illustrated in FIG. 5. Since the displacement distance of the optical axis and the displacement distance of the offaxial principal ray which are caused on the image surface by inclining the plane parallel plate 2 are different from each other, an image of object formed at an image height I' with the plane parallel plate 2 set perpendicular to the optical axis becomes focused at another image height $I_0$ by inclining the plane parallel plate 2 for the angle $\theta$, thereby producing the expansion/contraction $I' - I_0$. Since the plane parallel plate 2 functions at different degrees for rays having different inclination angles, the "blur of spot image" and the "expansion/contraction of image" have different values dependently on F number and distance as measured from the exit pupil of the master lens to the image surface as visualized in FIG. 7 and FIG. 8. FIG. 7 shows graphs illustrating the blurs of spot images on the optical axis and FIG. 8 are graphs visualizing the expansion/contraction of images. F number of the master lens is taken as the abscissa and the blur of spot image is taken as the ordinate in FIG. 7, whereas the distance as measured from the image surface 3 to the exit pupil of the master lens 1 is taken as the abscissa and the expansion/contraction of image is taken as the ordinate in FIG. 8. The graphs illustrated in these drawings were traced on assumptions the plane parallel plates 5 mm thick were inclined so as to displace the optical axis 0.2 mm downward. The graphs traced in the solid lines and those traced in the dashed lines represent calculation results obtained with a plane parallel plate 2A having an index of refraction of $n_{2A} = 1.883$ and another plane parallel plate having an index of refraction $n_{2B} = 1.48749$ respectively. In these cases, the plane parallel plates 2A and 2B were inclined 3.88° and 6.96° respectively. Further, the upper graphs correspond to the upper marginal ray and the principal ray having the positive image height shown in FIG. 5 and FIG. 6, whereas the lower graphs correspond to the lower marginal ray and the principal ray having the negative image height. From FIG. 7, it will be understood that the spot images are blurred more remarkably at a smaller F-number. Within a region where F-number is smaller than 2.8, the spot images are blurred at such degrees as to degrade damage quality. Within a region where F-number is larger than 4.0, on the other hand, the spot images are blurred at negligible degrees. Further, from FIG. 8, it will be understood that the expansion/contraction of image is sufficiently small when the exit pupil is sufficiently far from the image surface 3, but that the expansion/contraction of image is very remarkable and poses a problem when the exit pupil is located near the image surface 3. In order to limit the expansion/contraction $\Delta I$ of image within 1/10 of the displacement distance $\delta$ of the optical axis on an assumption that it is 0.2 mm, the distance as measured from the exit pupil to the image surface 3 must be at least 110 mm for the plane parallel plate 2B or at least 80 mm for the plane parallel plate 2A.

Figure 9:
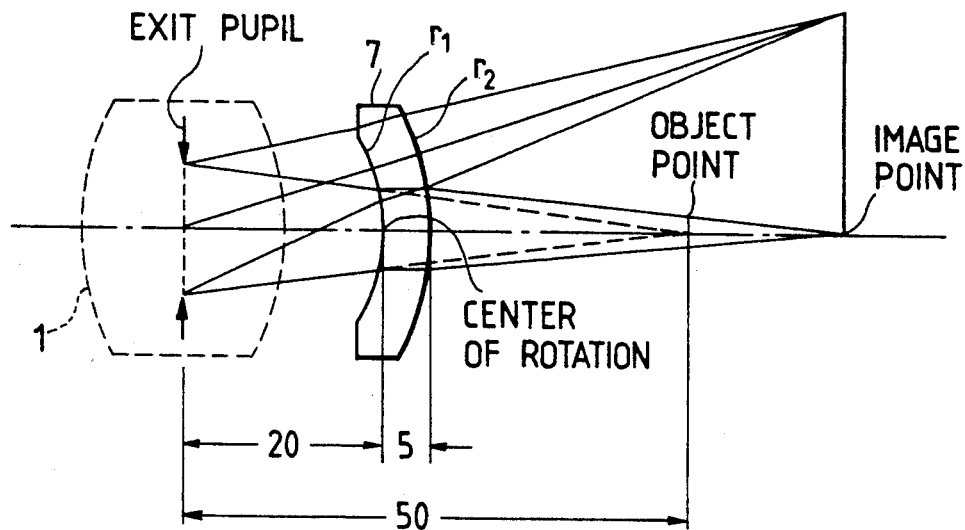
FIG. 9 is a sectional view illustrating the fundamental composition of the image stabilizing optical system according to the present invention.

Most of the zoom lens systems which are generally used in these days have F-numbers of 4.0 or higher and distances of 100 mm or shorter as measured from the exit pupils to the image surface 3. Within the range described above, image quality is degraded more remarkably under the influence due to the expansion/contraction of image than that due to the blur of spot image as is clear from FIG. 7 and FIG. 8. Accordingly, it will be understood that the expansion/contraction of image must be reduced without increasing the blur of spot image in order to improve the conventional example shown in FIG. 1 so as to be usable in the general zoom lens systems. First, let us discuss the reduction of the expansion/contraction of image. From FIG. 8, it is understood that the expansion/contraction of image is reduced when the exit pupil is located farther from the image surface 3. This is mainly because the difference in the angle of incidence on the plane parallel plate 2 is reduced between the paraxial principal ray and the offaxial principal ray. By arranging a meniscus lens component 7 concentric with the exit pupil of the master lens at a location relatively near the exit pupil as shown in FIG. 9 and rotating the meniscus lens component 7 around the vertex of the first surface (the surface located on the side of incidence) thereof, the expansion/contraction of image is reduced though the exit pupil is located near the image surface 3. In FIG. 9, "object point" means the position of an image formed by the master lens only and "image point" means the position of an image formed by the master lens plus the meniscus lens component. When the meniscus lens component 7 is completely concentric with the exit pupil, however, the magnification of the image stabilizing optical system is determined uniquely by the position of the exit pupil, thereby lowering flexibility for design.

Re-examination of FIG. 8 will clarify that the upper image is expanded and the lower image is contracted by raising the optical axis upward, i.e., by changing the imaging condition from the condition traced in the dashed lines to that traced in the solid lines. This means that the upper principal ray and the lower principal ray are displaced for a longer distance than the optical axis. It is therefore possible to reduce the difference in the expansion/contraction between the upper and lower images by displacing the optical axis for a longer distance.

Figure 10:
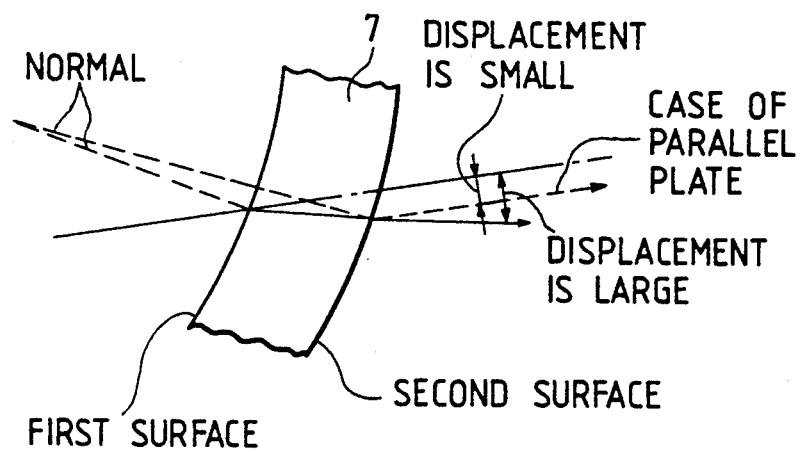
FIG. 10 is a diagram descriptive of a fact that an inclination angle smaller than that of the plane parallel plate is sufficient for a concentric meniscus lens component used in an image stabilizing optical system.

When the concentric meniscus lens component 7 shown in FIG. 9 is inclined for stabilizing image, on the other hand, the meniscus lens component 7 is rotated at a smaller angle than the plane parallel plate 2 to displace the optical axis for the same distance, thereby reducing the variation of angle of incidence for the offaxial principal ray. In other words, the normal to the first surface at the point of incidence thereon is not parallel with the normal to the second surface (the surface located on the image side) at the point of incident thereon as shown in FIG. 10 when the concentric meniscus lens component 7 is used, whereby the angle of refraction becomes smaller on the second surface than that in the case where the plane parallel plate 2 is used. For this reason, the ray emerging from the second surface is not parallel with the ray incident on the first surface, but inclined therefrom. As a result, the concentric meniscus lens component 7 displaces the optical axis for a longer distance on the image surface 3 than the plane parallel plate 2 which has the same inclination angle as that of the meniscus lens component 7. Accordingly, the meniscus component lens 7 displaces the optical axis for a sufficient distance even at a small inclination angle, reduces the variations of angle of incidence at the marginal portion of the image surface 3 owing to the small inclination angle as compared with the variation caused by the plane parallel plate 2, and can eliminate the difference between the paraxial and offaxial principal rays. That is to stay, the system illustrated in FIG. 9 provides a corrective measure for the conventional example using the plane parallel plate 2, or can correct the defect even when the meniscus lens component 7 is deviated a little from the concentric condition. Further, the system shown in FIG. 9 is compatible, like the conventional example using the plane parallel plate 2, with a small actuator for driving the lens component, thereby making it possible to compose a compact optical system having a simple composition.

Now, the present invention will be described more detailedly below with reference to the preferred embodiments illustrated in the accompanying drawings.

Embodiment 1

The Embodiment 1 has a composition which is quite the same as the fundamental composition illustrated in FIG. 9. Speaking concretely, the meniscus lens component 7 concentric with the exit pupil of the master lens 1 is arranged at a location relatively near said exit pupil so as to be rotatable around the vertex of the front surface thereof. In the Embodiment 1, the meniscus lens component 7 has a radius of curvature $r_1$ of $-20$ mm on the first surface thereof, a radius of curvature $r_2$ of $-25$ mm on the second surface thereof, thickness of 5 mm and an index of refraction of 1.883. Further, the distances as measured from the exit pupil to the first surface and the object point are 20 mm and 50 mm respectively, and the image height is 21.6 mm. Furthermore, the meniscus lens component 7 is rotated for an angle of 1.87° to obtain $\delta=0.2$ mm and has a magnification of $\times 1.3063$. Since the expansion/contraction $\Delta I$ of image is as listed in Table 1 shown below, images are expanded and contracted at reduced degrees though the exit pupil is located near the image surface. Moreover, the rotating angle $\theta$ of the meniscus lens component 7 to displace the optical axis for the distance $\delta=0.2$ mm is 1.87° as described above and smaller than that of the plane parallel plate required for the same purpose.

In addition, the term "image height ratio" used in the following tables means image heights normalized to the maximum image height (21.60 mm).

TABLE 1

| $r_1$ | Image Height Ratio | $\Delta I$ |
|---|---|---|
| $-20$ | 1.0 | 0.012763 |
| | $-1.0$ | $-0.008653$ |
| | 0.9 | 0.010514 |
| | $-0.9$ | $-0.007009$ |
| | 0.7 | 0.006663 |
| | $-0.7$ | $-0.003937$ |
| | 0.4 | 0.002509 |
| | $-0.4$ | $-0.000952$ |

Now, blurs of spot images in the Embodiment 1 will be examined below:

FIG. 11A shows spot diagrams (front elevations of the image surface in which intersections between rays and the image surface are traced in spots) at various image heights at $\theta=0°$, whereas FIG. 11B and FIG. 11C are spot diagrams at various image heights at $\theta=1.87°$. Comparison between the spot diagrams obtained before the rotation of the meniscus lens component 7 with those obtained after the rotation thereof indicates little variations in the outside profiles of the spot diagrams, thereby proving that the Embodiment 1 causes nearly no degradation of image quality. In addition, the origins on the coordinates indicate the image heights and the mark "++" represents a length of 10 μ. However, the centers of gravity of the spot diagrams are deviated from the principal ray coincident with the optical axis for a distance which is substantially constant at all the image heights as listed in the following Table 2:

TABLE 2

(Positions of centers of gravity of the spot diagrams)

| Image Height | Position of center of gravity at θ = 0° | Position of center of gravity at θ = 1.87° | Deviation |
|---|---|---|---|
| 21.60 | 21.602 | 21.616 | 0.014 |
| 19.44 | 19.442 | 19.456 | 0.014 |
| 15.12 | 15.121 | 15.136 | 0.015 |
| 8.64 | 8.641 | 8.655 | 0.014 |
| 0 | 0.000 | 0.014 | 0.014 |
| −8.64 | −8.641 | −8.627 | 0.014 |
| −15.12 | −15.121 | −15.108 | 0.013 |
| −19.44 | −19.442 | −19.428 | 0.014 |
| −21.60 | −21.602 | −21.589 | 0.013 |

It is generally necessary to determine displacement distance of an image stabilizing optical system (the rotating angle of the meniscus lens component in case of the present invention) so as to be matched not with the displacement distance of the principal ray coincident with the optical axis, but with the displacement distance of the centers of gravity of the spot diagrams. However, in the Embodiment 1 wherein the deviation of the centers of gravity of the spot diagrams from the principal ray coincident with the optical axis is constant regardless of image height, it is possible to correct the deviation or obtain the image stabilizing effect by displacing the optical system or rotating the meniscus lens component 7 for a definite distance or a definite angle. Further, since the centers of gravity are brought closer to the principal ray coincident with the optical axis as the diameter of the exit pupil of the master lens is reduced by stopping down the stop arranged therein, it is sufficient for correcting the deviation of the centers of gravity to modify the rotating angle of the meniscus lens component 7 in conjunction with aperture size of the stop.

Though the above-described method to rotate the meniscus lens component 7 concentric with the exit pupil is effective for stabilizing images, it is desirable that the meniscus lens component 7 has a negative radius of curvature on each of the surfaces thereof since the exit pupil is generally located on the object side of the meniscus lens component 7. In addition, though the center of rotation can be selected relatively optionally in the Embodiment 1, the center of curvature common to both the surfaces cannot be selected as the center of rotation, since such a selection will make the meniscus lens component 7 completely concentric with the exit pupil, whereby images are not displaced by rotating the meniscus lens 7.

Embodiment 2

Figure 12:
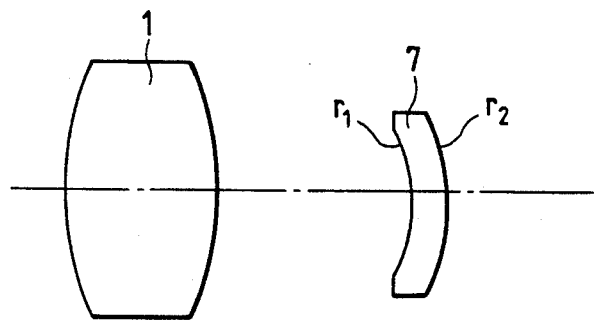
FIG. 12 is a sectional view illustrating a fundamental composition of an Embodiment 2 of the image stabilizing optical system according to the present invention.

In the Embodiment 2, the meniscus lens component 7 is set in a position which is a little deviated from the concentric condition as shown in FIG. 12 to exemplify a case where the meniscus lens component 7 set in such a position can correct the defect of the plane parallel plate. When the meniscus lens component 7 is inclined using the radius of curvature $r_1$ on the first surface thereof as a parameter, images are expanded or contracted in the manner illustrated in FIG. 13 and summarized in the following Table 3. In this embodiment, the radius of curvature $r_2$ of the second surface of the meniscus lens component 7 is determined so that this lens has a magnification of ×1. Further, the image height is set at 21.6 mm, and the meniscus lens component 7 is 5 mm thick and has an index of refraction of 1.883. Furthermore, the first surface of the meniscus lens component 7 is set at a location 20 mm distant from the exit pupil, the distance as measured from the object point to the exit pupil is set at 50 mm, and the meniscus lens component 7 is inclined for an angle to obtain δ=0.2 mm.

TABLE 3

| $r_1$ | $r_2$ | θ(') | ΔI |
|---|---|---|---|
| −15 | −16.0170 | 97.8 | −0.043050 |
|  |  |  | 0.043915 |
| −20 | −20.5746 | 117.3 | −0.018172 |
|  |  |  | 0.018821 |
| −25 | −25.1319 | 133.0 | −0.004327 |
|  |  |  | 0.004543 |
| −26 | −26.0434 | 136.0 | −0.002380 |
|  |  |  | 0.002163 |
| −27 | −26.9549 | 139.0 | −0.000433 |
|  |  |  | 0.000000 |
| −28 | −27.8664 | 141.5 | 0.001514 |
|  |  |  | −0.002163 |
| −29 | −28.7779 | 144.0 | 0.003245 |
|  |  |  | −0.003894 |
| −30 | −29.6893 | 146.5 | 0.004327 |
|  |  |  | −0.006274 |
| −45 | −43.3617 | 176.0 | 0.020984 |
|  |  |  | −0.023796 |
| −65 | −61.5915 | 200.0 | 0.030286 |
|  |  |  | −0.035478 |
| −95 | −88.9361 | 223.0 | 0.036127 |
|  |  |  | −0.43050 |
| −135 | −125.3957 | 240.0 | 0.038507 |
|  |  |  | −0.047160 |

Figure 13:
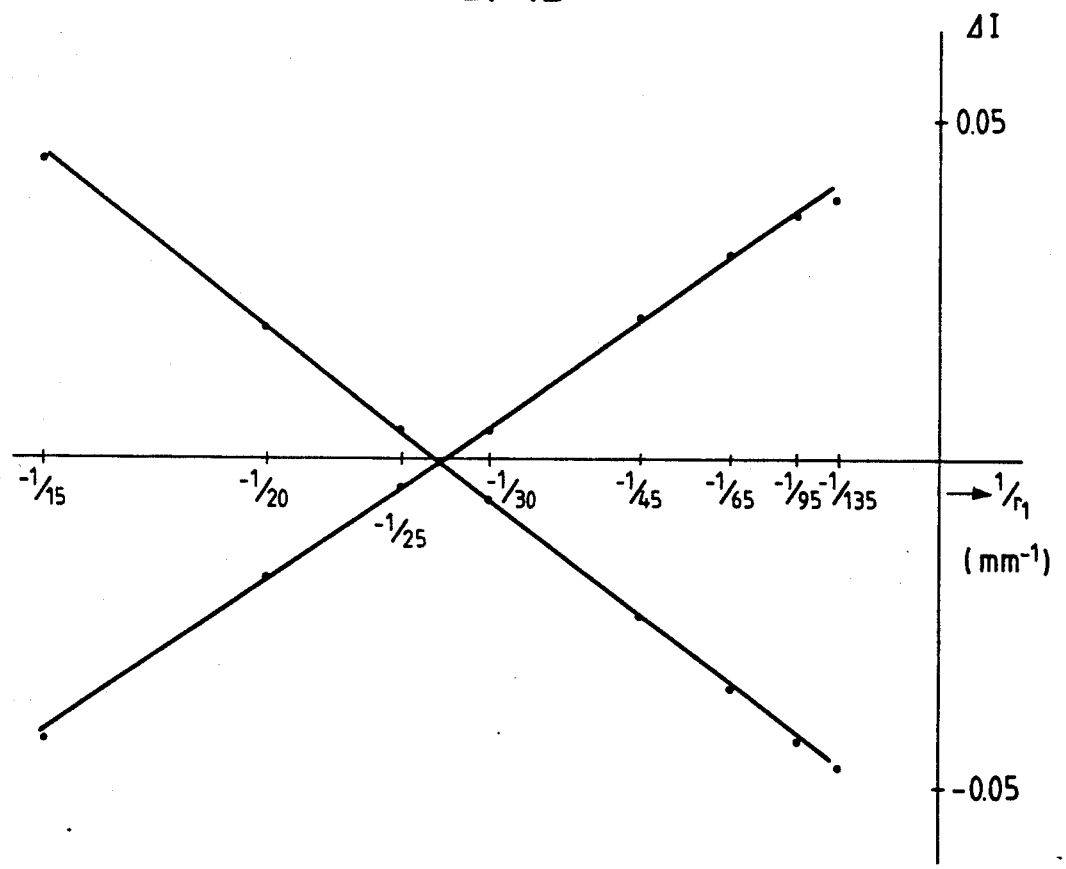
FIG. 13 is a graph illustrating a range wherein an image is expanded or contracted at low degrees by inclining the meniscus lens component in the Embodiment 2 of the present invention.

From the graph illustrated in FIG. 13, it is understood that the expansion/contraction of image is minimized when the radius of curvature $r_1$ of the first surface is approximately −27 mm. At this time, $r_2$ is −26.9549 mm and the inclination angle θ for obtaining δ=0.2 mm is 2.32°. It is further understood that the radius of curvature $r_1$ of the first surface is selectable within a range from −20° to −45° when the expansion/contraction of image is allowable up to 0.02 mm or within a range from −15 to −135 mm when the expansion/contraction of image is allowable up to 0.04 mm. When the maximum radius of curvature on the first surface is represented by $r_M$, the minimum radius of curvature of the first surface is designated by $r_m$ and the radius of curvature of the first surface which minimizes distortion is denoted by $r_c$, the following relationship is obtained within the range of $r_1$ = −14 to −135 as seen from FIG. 13:

$$1/r_c - 1/r_M = 1/r_m - 1/r_c$$

When the expansion/contraction of image up to 0.04 is allowable, we therefore obtain:

$$1/r_c - 1/r_M = 1/r_m - 1/r_c < 0.03, r_M < 0$$

The following table 4 lists values of the expansion/contraction of image of various image heights which are calculated for the radii of curvature $r_1$ around "27 mm, concretely within a range from −25 to −30 mm.

Table 4 clarifies a fact that images are expanded or contracted very little by inclining the meniscus lens component 7 for stabilizing the images.

Finally, let us examine blurs of spot images in the example wherein the meniscus lens component 7 has the radius of curvature $r_1$ of −27 mm on the first surface thereof. Spot diagrams for this examination are shown in FIG. 14A, FIG. 14B and FIG. 14C. FIG. 14A shows spot diagrams at various image heights on the image surface at $\theta=0°$, whereas FIG. 14B and FIG. 14C illustrate spot diagrams at various image heights on the image surface at $\theta=2.32°$. Comparison of the spot diagrams obtained before inclining the meniscus lens component 7 with those obtained after inclining the meniscus lens component 7 indicates little variation of the profiles of the spot diagrams as in the case of the Embodiment 1, thereby providing nearly no degradation of image quality. Further, the following Table 5 lists deviations of the centers of gravity of the spot diagrams from the principal ray coincident with the optical axis. Since the deviations are substantially constant regardless of image height, the Embodiment 2 permits easily correcting the deviations, like the Embodiment 1, so as to obtain the image stabilizing effect.

TABLE 4

| $r_1$ | Image Height Ratio | ΔI |
| --- | --- | --- |
| −25 | 1.0 | 0.004327 |
|  | −1.0 | 0.004543 |
|  | 0.9 | −0.003894 |
|  | −0.9 | 0.003894 |
|  | 0.7 | −0.002726 |
|  | −0.7 | 0.002423 |
|  | 0.4 | −0.001038 |
|  | −0.4 | 0.000863 |
| −26 | 1.0 | 0.002380 |
|  | −1.0 | 0.002163 |
|  | 0.9 | −0.002142 |
|  | −0.9 | 0.001752 |
|  | 0.7 | −0.001666 |
|  | −0.7 | 0.001211 |
|  | 0.4 | −0.000779 |
|  | −0.4 | 0.000346 |
| −27 | 1.0 | −0.000433 |
|  | −1.0 | 0.000000 |
|  | 0.9 | −0.000389 |
|  | −0.9 | 0.000195 |
|  | 0.7 | −0.000757 |
|  | −0.7 | 0.000000 |
|  | 0.4 | −0.000433 |
|  | −0.4 | 0.000087 |
| −28 | 1.0 | 0.001514 |
|  | −1.0 | −0.001947 |
|  | 0.9 | 0.001168 |
|  | −0.9 | 0.001558 |
|  | 0.7 | 0.000303 |
|  | −0.7 | −0.001060 |
|  | 0.4 | −0.000087 |
|  | −0.4 | −0.000433 |
| −29 | 1.0 | 0.003245 |
|  | −1.0 | −0.003894 |
|  | 0.9 | 0.002336 |
|  | −0.9 | −0.003115 |
|  | 0.7 | 0.001060 |
|  | −0.7 | −0.002120 |
|  | 0.4 | −0.000173 |
|  | −0.4 | −0.000779 |
| −30 | 1.0 | 0.004759 |
|  | −1.0 | −0.005841 |

TABLE 5

| (Locations of centers of gravity of spot diagrams) | | | |
| --- | --- | --- | --- |
| Image Height | Location of center of gravity at $\theta = 0°$ | Location of center of gravity at $\theta = 2.32°$ | Deviation |
| 21.60 | 21.570 | 21.572 | 0.002 |

TABLE 5-continued

| (Locations of centers of gravity of spot diagrams) | | | |
| --- | --- | --- | --- |
| Image Height | Location of center of gravity at $\theta = 0°$ | Location of center of gravity at $\theta = 2.32°$ | Deviation |
| 19.44 | 19.412 | 19.415 | 0.003 |
| 15.12 | 15.097 | 15.101 | 0.004 |
| 8.64 | 8.626 | 8.630 | 0.004 |
| 0 | 0.000 | 0.004 | 0.004 |
| −8.64 | −8.626 | −8.622 | 0.004 |
| −15.12 | −15.097 | −15.094 | 0.003 |
| −19.44 | −19.412 | −19.409 | 0.003 |
| −21.60 | −21.570 | −21.566 | 0.004 |

When it is required to correct especially favorably the aberrations to be produced by the meniscus lens component 7 regardless of the inclination angle thereof in the Embodiment 1 or 2 described above, it is desirable to compose the image stabilizing optical system not of a single meniscus lens component but of a combination of a plurality of lens components, or control the aberrations in the master lens so as to minimize aberrations in the composite system consisting of the master lens and the image stabilizing optical system. Especially when the image stabilizing optical system is composed by cementing positive and negative lens elements to each other or arranging a plurality of lens components each comprising at least one positive lens element and at least one negative lens element, it is possible to prevent chromatic aberration from being produced in the image stabilizing optical system. Though the vertex of the first surface of the meniscus lens component 7 is selected as the center of rotation for the meniscus lens component 7 in the Embodiments 1 and 2 described above, it is possible to select the vertex of the second surface of the meniscus lens component 7 or another point located outside the meniscus lens 7 as the center of rotation. However, optimum shape of the meniscus lens component 7 will be changed by relocating the center of rotation. In order to facilitate control of the inclination of the meniscus lens component 7 and obtain symmetry of aberrations, it is preferable to select the center of rotation at a point on the optical axis.

The image stabilizing optical system according to the present invention is applicable effectively to photographic lens system which have distances shorter than 80 to 110 mm as measured from the exit pupils to the image surfaces thereof. When the distances are longer than 90 to 110 mm, the plane parallel plate is sufficiently usable as is clear from FIG. 8 and the meniscus lens will adversely produce aberrations. Hence, the following relationship establishes:

$1/r_c - 1/r_M = 1/r_m - 1/r_c < 0.03$, $r_M < 0$, $-110 < r_c < 0$

What is claimed is:

1. An image stabilizing optical system, comprising:
a master lens system for forming an image of an object; and
image position correcting means disposed between said master lens system and an image position thereof;
said image position correcting means including a correcting lens component with entrance and exit surfaces having concave shapes opposed to an exit pupil of said master lens system;

said image position being corrected by changing an inclination of said correcting lens component relative to said master lens system; and said correcting lens component satisfying the following conditions:

$F_s < 0.03$ $r_m < 0$ $FR_s - 1/r_c - 1 1/r_m = 1/r_m - 1/r_c$ where $r_m$ is the maximum radius of curvature of the entrance surface of the correcting lens component, $r_m$ is the minimum radius of curvature of the entrance surface of the correcting lens component, and $r_c$ is the radius of curvature of the entrance surface of the correcting lens component in the case where distortion produced by the correcting lens component becomes minimum.

2. An image stabilizing optical system according to claim 1 satisfying the following condition:

$-110 < r_c < 0$.

* * * * *